United States Patent [19]

Kelley

[11] 4,078,615

[45] Mar. 14, 1978

[54] ADJUSTABLE SPRING LOADED AGRICULTURAL TOOL MOUNTING

[75] Inventor: Clarence R. Kelley, Mishawaka, Ind.

[73] Assignee: C. C. Kelley & Son, Inc., Mishawaka, Ind.

[21] Appl. No.: 732,741

[22] Filed: Oct. 15, 1976

[51] Int. Cl.² ............... A01B 35/24; A01B 61/04
[52] U.S. Cl. ...................... 172/711; 172/705
[58] Field of Search ............ 172/707, 708, 705, 711, 172/265, 710

[56] References Cited

U.S. PATENT DOCUMENTS

| | | | |
|---|---|---|---|
| 2,850,956 | 9/1958 | Rogers | 172/705 |
| 3,012,617 | 12/1961 | Anderson | 172/705 X |
| 3,098,529 | 7/1963 | Wade | 172/705 X |
| 3,414,252 | 12/1968 | Frager | 172/711 X |
| 3,981,367 | 9/1976 | Mydels | 172/265 |

FOREIGN PATENT DOCUMENTS 946,676  5/1974  Canada .................. 172/708

Primary Examiner—Richard J. Johnson
Attorney, Agent, or Firm—Oltsch & Knoblock

[57] ABSTRACT

An adjustable spring loaded agricultural tool mounting accommodating pivotal movement of the tool relative to a normal operative relation to an implement frame when said tool encounters an obstacle. The tool includes a part projecting upwardly and rearwardly from the tool pivot and a longitudinally extensible and adjustable strut is pivoted in upwardly and rearwardly spaced relation to the tool pivot and bears against the upper free end portion of said upwardly and rearwardly extending tool part. At least one of said strut and said upwardly and rearwardly projecting tool part includes a spring portion.

2 Claims, 6 Drawing Figures

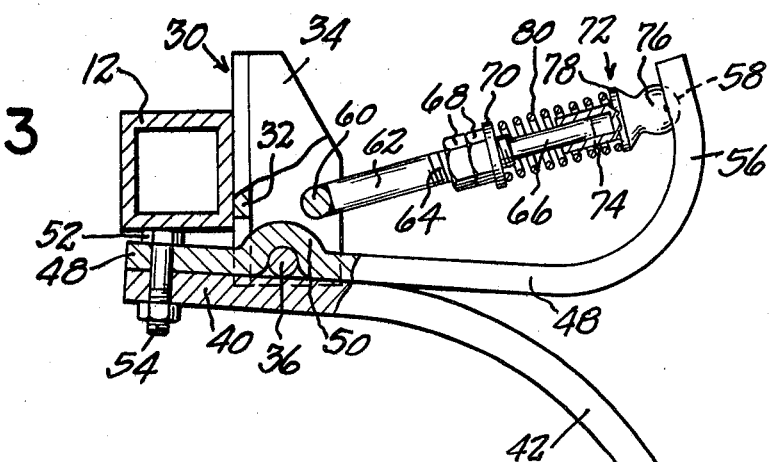
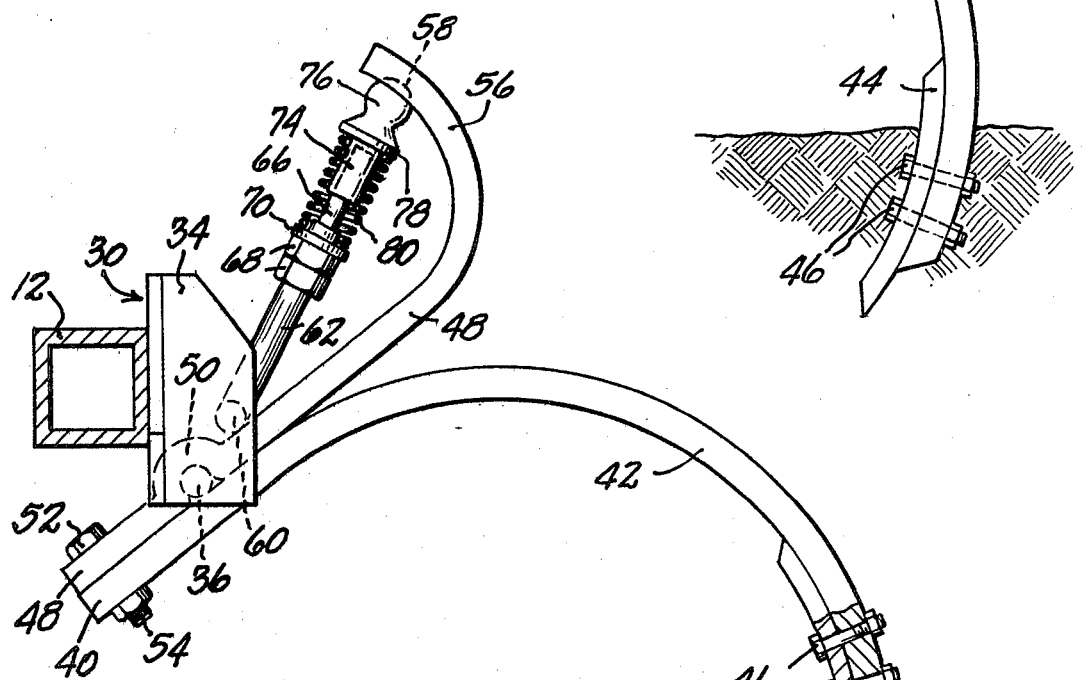
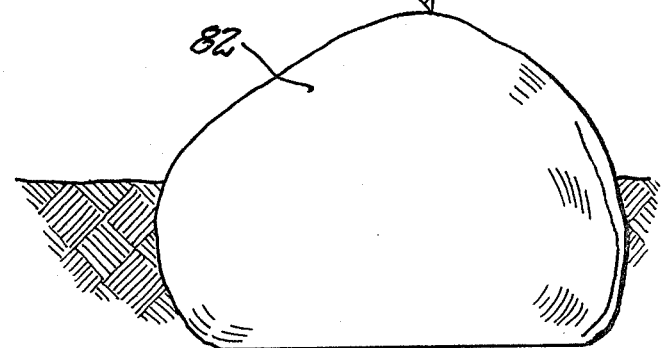

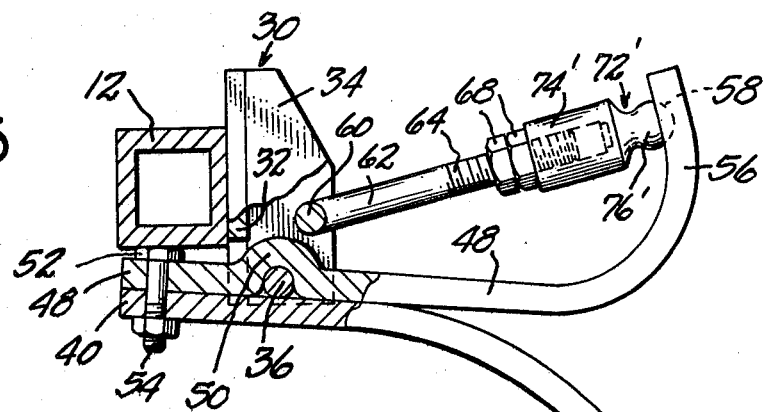
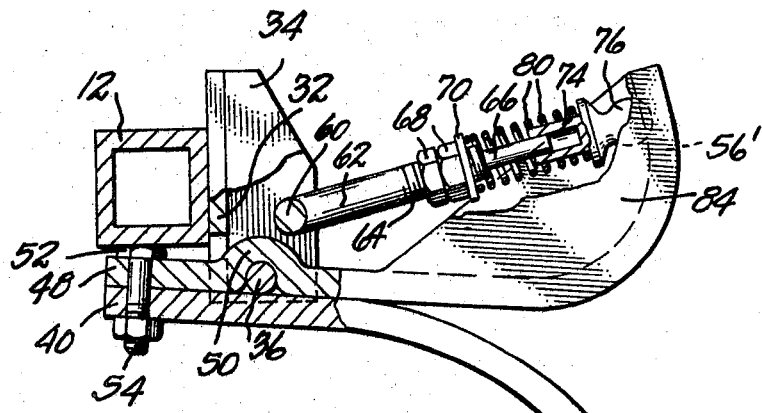
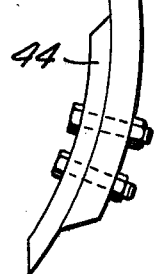

ADJUSTABLE SPRING LOADED AGRICULTURAL TOOL MOUNTING

SUMMARY OF THE INVENTION

This invention relates to improvements in adjustable spring loaded agricultural tool mountings, and particularly to means for mounting tools such as chisel plows, cultivator spring teeth and the like.

Heretofore it has been common practice in mounting spring teeth and chisel plows to provide means accommodating change in position of the tool if it encounters obstacles in the ground, such as rocks. Such prior mounting means have been of several types and commonly have utilized double thickness leaf springs or plural coil springs associated with each tool, and have entailed various means for mounting the tool and the springs with respect to the frame of the implement. The use of multiple leaf springs or multiple coil springs associated with each tool has had various disadvantages including difficulty in adjustment of the applied spring pressure for different soil conditions, different depths of soil penetration by the tool, and the like.

It is the primary object of this invention to provide a tool mounting which is readily and quickly adjustable to accommodate variation in applied spring tension and other conditions experienced during use of agricultural implements.

A further object is to provide a device of this character which is simple in construction and inexpensive, and which requires minimum effort to change the adjustment of the tool setting.

Other objects will be apparent from the following specification.

In the drawings:

FIG. 3 is a side view of one embodiment of my adjustable tool mounting with parts shown in section.

FIG. 4 is a side view illustrating the tool in flexed position to pass an obstacle.

FIG. 5 is a side elevational view, with parts shown in section, illustrating a modified embodiment of the invention.

FIG. 6 is a side elevational view illustrating another modified embodiment of the invention.

DESCRIPTION OF THE PREFERRED EMBODIMENTS

Figure 1:
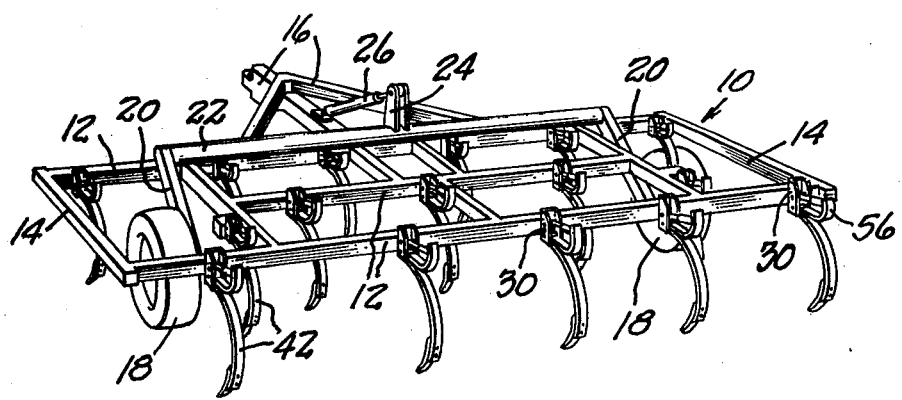
FIG. 1 is a perspective view of a cultivator embodying my invention.

Referring to the drawings, and particularly to FIGS. 1-4 which illustrate one embodiment of the invention, the numeral 10 designates an implement of the field cultivator or chisel plow type which has a frame including a plurality of rigid transverse frame members 12 and longitudinal rigid frame members 14. The frame members 12 and 14 are rigidly connected by welding or any other means to provide a rigid frame structure. The frame has suitable draft means 16 for connection to a towing tractor, which draft means may be of any desired type adapted for towing connection with a tractor or for connection with a lift hitch mechanism of a tractor. In the form shown the implement or cultivator is provided with ground wheels 18 journaled on rigid mounting arms 20 projecting downwardly and rearwardly from a transverse rockable member 22 journaled or otherwise rotatable relative to one or more fixed parts of the implement frame by means not shown. The rockable member 22 may be provided with an upstanding arm structure 24 whose position is controlled by any suitable means 26, such as a hydraulic adjustment member, which is extensible and retractable and is connected at one end to the member 24 and at its opposite end to the draft means 16. The setting of the rockable member 22 and of the ground wheels 18 may be utilized to control the working depth of the implement or to provide ground clearance for transport of the implement.

One or more of the transverse frame members 12 have fixedly secured or mounted thereon in spaced relation along the length thereof a plurality of bracket members 30 which preferably are of U-shape in top plan view, being characterized by a transverse vertical plate portion 32 and spaced vertical flanges 34. Each bracket is of a vertical dimension greater than the vertical dimension of the frame member 12 on which it is mounted and projects therebelow. The lower edge of the transverse vertical bracket plate 32 preferably terminates adjacent the bottom of the frame member 12 and the flanges 34 project to a lower level than the bottom of the frame member 12. A transverse pivot pin 36 extends between the flanges 34 at a lower level than the bottom of the transverse frame member 12 and is rearwardly spaced from the member 12.

Bracket members 30 serve to mount pivotally implement tools, such as spring teeth, chisel plows or the like. In the embodiment illustrated in FIG. 2, 3 and 4 the tool includes an elongated member 40 having a downwardly curved part 42 upon the lower end of which may be mounted a ground working member 44, such as a chisel which preferably is removably mounted on the member 40 in fixed position by bolts or other securing means 46. The tool part 40 has fixed or otherwise secured thereto an elongated member 48, such as a plate, which has an arcuate offset portion 50 intermediate its ends which cooperates with the member 40 when positioned in contacting relation therewith to encircle the pivot pin 36 and thereby accommodate rocking of the tool relative to the frame 12 and the mounting bracket 30. The part 50 is spaced from the forward ends of the parts 40 and 48, which parts project forwardly below the mounting frame member 12 and carry spacer means 52 which normally bear against the bottom surface of the frame member 12 as seen in FIG. 3. The spacer means 52 may constitute the head of a bolt or other means which serves to rigidly interconnect the parts 40 and 48. The parts 40 and 48 are preferably in contact for a substantial distance and the part 48 projects rearwardly beyond the offset 50 in divergent relation to the downwardly projecting tool part 42 and preferably terminates in an upwardly bent end portion 56. The member 48, 56 is preferably formed of resilient material to constitute a leaf spring, and preferably has a socket or recess 58, which may be part-spherical, and which is formed in its forward face adjacent the free end thereof.

The means for adjusting the spring loading of the tool may take several forms. That shown in FIGS. 2, 3 and 4 entails a pivot pin 60 journaled in the bracket flanges 34 spaced above and rearwardly relative to the pivot pin 36. Fixed to the pin 60 between the bracket flanges 34 is a shank member 62 to provide a T-shaped member, said shank being screw threaded at 64 and preferably terminating in a reduced diameter end portion 66. An adjustment nut or a pair of such nuts 68 are threaded on the shank portion 64 and a washer 70 preferably bears against the outermost nut. An abutment member 72 has a tubular projecting part 74 whose inner diameter accommodates a snug sliding fit thereof upon the reduced shank part 66 for endwise sliding movement thereon. The abutment member preferably includes a part-spherical head 76 at its opposite end adapted to seat in the socket or recess 58 of the upwardly bent portion 56 of the leaf spring member. The outer diameter of the tubular part 74 is smaller than the adjacent part of the abutment member which provides a shoulder 78 concentric therewith. A coil spring 80 encircles the shank portion 66 and tubular abutment part 74 and bears at its opposite ends upon the washer 70 and the abutment shoulder 78.

In preparing the implement for plowing or cultivating, when the implement is to be supported by wheels 18 while working, the wheel mounting means are adjusted relative to the frame to control the depth at which the ground working tools are to penetrate the soil, and the adjusting nuts 68 of the tools are adjusted or set to control the resistance of the springs to pivoting of the tools from the working position shown in FIG. 3 in which the spacer means 52 abut the adjacent frame member 12. In the construction shown in FIGS. 2, 3 and 4 the latter adjustment is effected by the position of the adjustment nuts upon the shanks 62 which serves to control the compression of the springs 66 and/or the flexure of a leaf spring 48, 56.

As the implement operates to plow or cultivate the soil any obstacle, such as a stone 82, which is encountered by any one or more or the tools causes that tool to be pivoted sufficiently to pass over the obstacle, as shown in FIG. 4. Such pivotal movement entails compression of the spring 80 and/or flexure of the leaf spring 56, or both actions. In the event the coil spring is of lesser strength than the leaf spring 56, initial reaction to pivotal movement of the tool will compress the spring 80 incident to pivotal movement of the shank 62 from its FIG. 3 position toward a position in which said shank is axially aligned with the axes of the pivot pins 36 and 60. When a predetermined amount of free play of tubular part 74 of the abutment member on the shank part 66 causes abutment of the shank 66 with the inner end of the receiving socket of the abutment member 72 any further displacement or pivoting of the tool will result in flexure of the leaf spring part 56 as illustrated in FIG. 4. It will be apparent that the spring tensions of the respective resilient parts may be of any selected values, that the parts are simple in construction, and that adjustments can be effected easily and quickly.

In the modified embodiment of the invention which is illustrated in FIG. 5, parts similar to those in the previously described embodiment bear the same reference numerals. In this construction the shank 62 of the T-shaped pivot pin has its screw threaded portion 64 extending to the end thereof and is received in the complementary internally screw threaded socket part 74' of the abutment member 72' which has its head or end portion 76' received in the socket or recess 58 of the leaf spring member 52, 56. One or more nuts 68 threaded on the shank portion 64 serve as lock nuts when advanced into abutment with the end of the part 74' of the abutment member 72'.

Figure 2:
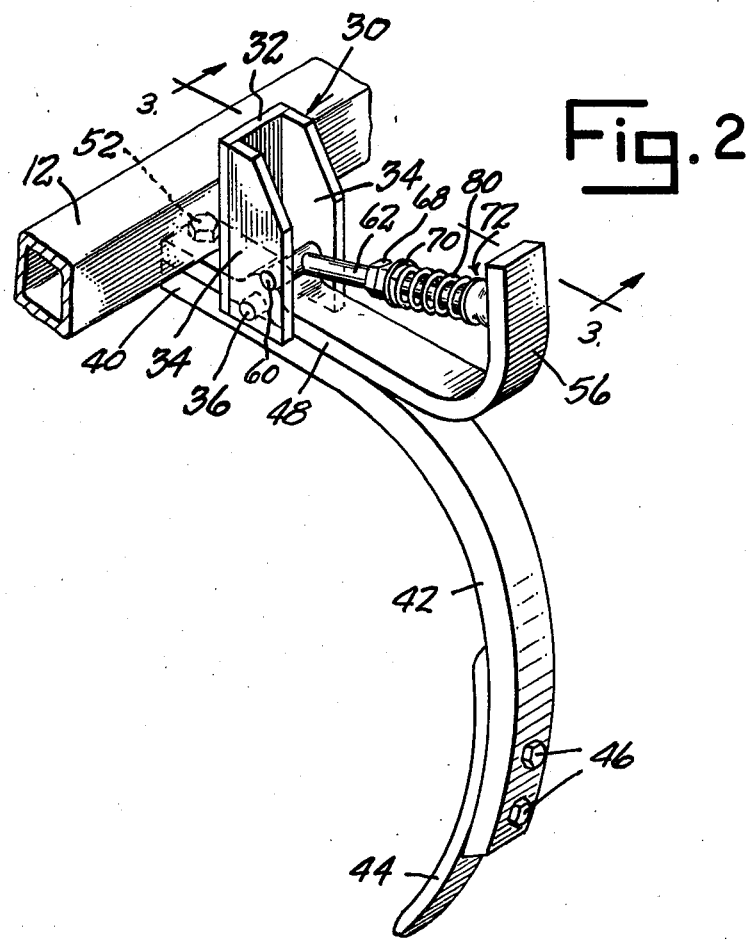
FIG. 2 is an enlarged perspective view of one embodiment of my adjustable tool mounting.

In this construction total reliance for spring action is placed upon the leaf spring 56 which constitutes the single spring associated with the tool mount as distinguished from the dual-spring arrangement of coil spring 80 and leaf spring 56 characterizing the embodiment illustrated in FIGS. 2-4. Spring adjustment is effected by the longitudinal position of the abutment member 72' upon the shank 62 to control the stress applied to maintain the tool in its position illustrated in FIG. 5 wherein the abutment member or spacer 52 bears against the frame member 12 to limit pivoting of the tool in a clockwise direction as viewed in FIG. 5. The positioning of the pivots 36 and 60 relative to the bracket 30 is relied upon to flex the spring 56 as the tool is pivoted about the pin 36 incident to contact of a tool with an obstacle and to ensure that the tool will return to its set or selected working position after the obstacle has been passed.

A third embodiment of the invention is illustrated in FIG. 6 where parts similar to those utilized in the embodiment illustrated in FIGS. 2, 3 and 4 are employed and bear the same reference numerals. The sole difference between the construction shown in FIG. 6 and that shown in FIGS. 2, 3 and 4 is that the upturned end portion 56' of the member 48 is rigidified, as by reinforcing flanges 84, so that said member 56 is no longer a resilient part or leaf spring and the sole resilient part of the tool mount is the coil spring 80, unless the part 42 of the tool possesses spring properties or some resilience.

In each embodiment of the invention the combination of the shank 62 and the abutment member 72 or 72' constitutes a strut which is pivoted at 76 above and rearwardly of the pivot 36 for the tool so that pivoting of the tool as occurs upon encountering an obstacle during working so changes its position as to apply to the spring acting to hold the tool in operative working condition an increase in stress proportional to the degree of movement of the tool from its desired operating position, that is, its movement in a counterclockwise direction about the pivot 36 as viewed in FIGS. 2, 3, 4, 5 and 6. It will be seen that in the construction illustrated in FIGS. 2, 3, 4 and 6 and change of the angular position of the strut 62,72 produces compression of the coil spring 80 incident to telescopic action or shortening of the struut 62,72. In the construction illustrated in FIG. 5, a change of the angular position of the strut 62.72' incident to pivoting of the tool about the pivot 36 increases the stress exerted on the tool by the leaf spring 56. In all cases, the amount of spring pressure to be exerted upon the tool to return it from a displaced to a selected working position after encountering and passing an obstacle is selected by adjustment of the position of the nut 68 upon the strut either solely, as in the construction as illustrated in FIGS. 2, 3, 4 and 6, or in conjunction with change of threaded adjustment of the abutment member 74' on the shank 62 in the construction illustrated in FIG. 5.

While the preferred embodiments of the invention have been illustrated and described, it will be understood that changes in the construction may be made within the scope of the appended claims without departing from the spirit of the invention.

What I claim is:

1. An adjustable spring loaded agricultural tool mounting wherein a tool is pivoted to an implement frame, comprising means pivoting said tool spaced from a rigid frame member, said tool including a part projecting downwardly rearwardly relative to said pivot and a part projecting upwardly rearwardly relative to said pivot, a strut pivoted on an axis parallel to and spaced rearwardly and upwardly from the pivot axis of said tool and bearing against the upper rear end portion of said upwardly rearwardly extending tool part, one of said strut and said upwardly rearwardly projecting tool part including a resilient element urging said tool to a position in which a portion thereof forwardly of its pivot axis normally abuts said rigid frame member, said strut being longitudinally extensible, and adjustable means for maintaining selected longitudinal adjustment of said strut, said upwardly projecting tool part constituting a leaf spring.

2. An adjustable spring loaded agricultural tool mounting as defined in claim 1, wherein said strut constitutes an elongated shank and an abutment head screw threaded in said shank.

* * * * *